United States Patent [19]

Unruh

[11] 4,087,135
[45] May 2, 1978

[54] EXCAVATOR IDLER-OUTRIGGER

[75] Inventor: Dale H. Unruh, Peoria, Ill.

[73] Assignee: Caterpillar Tractor Co., Peoria, Ill.

[21] Appl. No.: 724,205

[22] Filed: Sep. 17, 1976

[51] Int. Cl.² .............................................. B62D 55/14
[52] U.S. Cl. ......................................... 305/22; 305/27; 305/30
[58] Field of Search ......................... 305/22, 10, 30, 27, 305/29, 31, 32; 180/9.52

[56] References Cited

U.S. PATENT DOCUMENTS 3,901,563  8/1975  Day ........................................ 305/10

FOREIGN PATENT DOCUMENTS 372,108  5/1973  U.S.S.R. ................................. 305/30

Primary Examiner—Robert B. Reeves
Assistant Examiner—John P. Shannon

Attorney, Agent, or Firm—Wegner, Stellman, McCord, Wiles & Wood

[57] ABSTRACT

A track assembly for use on track-supported vehicles, such as excavators and the like, including a driven sprocket, a rigid undercarriage which extends forwardly of the sprocket and which supports the body of the vehicle, the undercarriage being supported by a series of linearly aligned track rollers, and an idler assembly, including a rigid linking member and idler wheel. The linking member is pivotally mounted on the front of the undercarriage and extends forwardly therefrom, and the idler wheel is rotatably mounted on the front of the linking member. A motive force is attached to the undercarriage and to the linking member to selectively move the idler assembly from a first position wherein the bottom of the idler wheel is lower than the bottom of the track rollers, and a second position wherein the bottom of the idler wheel is higher than the bottom of the track rollers. An endless track forms a circuit about the sprocket, track rollers and idler wheel.

4 Claims, 3 Drawing Figures

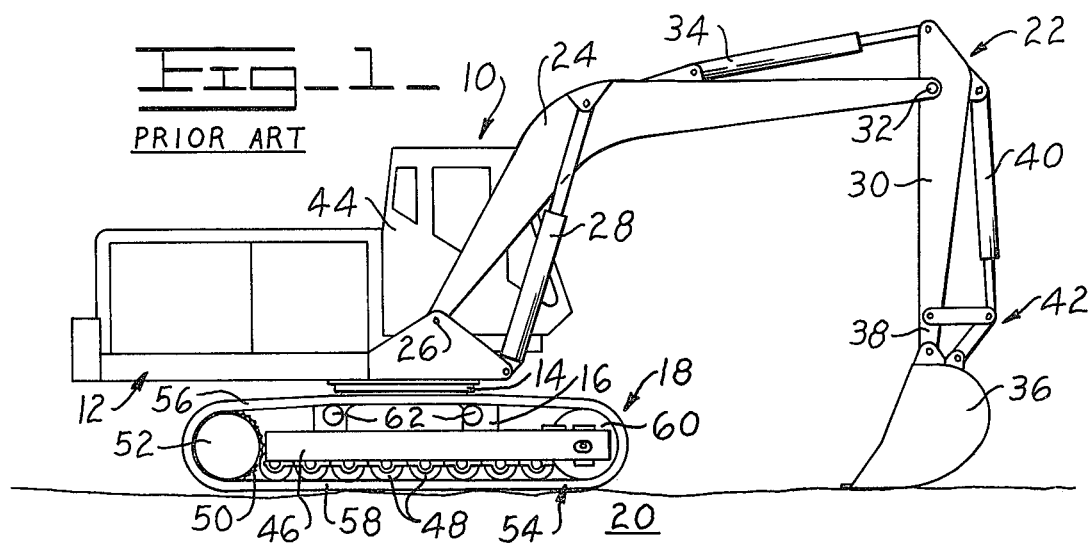
Fig-1- PRIOR ART
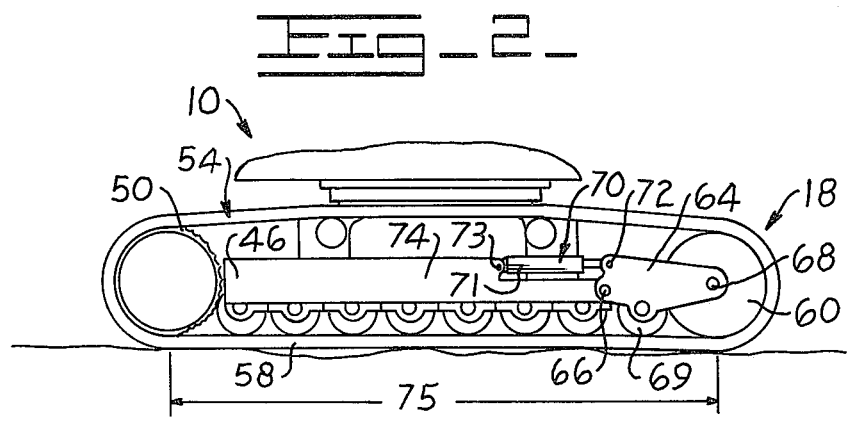
Fig-2-
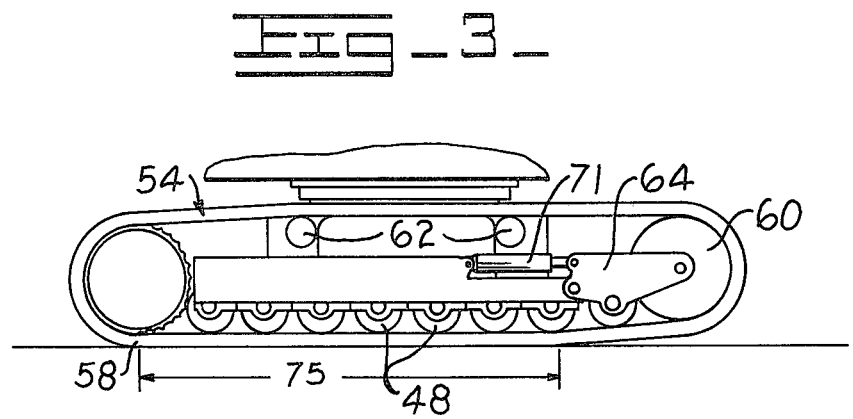
Fig-3-

4,087,135

EXCAVATOR IDLER-OUTRIGGER

BACKGROUND OF THE INVENTION

1. Field of the Invention

This invention relates to track-supported vehicles, such as excavators, and, more particularly, to adjustable idler wheel assemblies for such vehicles.

2. Description of the Prior Art

This invention relates to adjustable idler wheel assemblies used on track-supported vehicles, such as excavators and the like. The typical excavator is supported by a track system which is rigid and provides only a flat support surface. If the terrain over which such vehicles are operated is soft and/or irregular, the effective track length of the vehicle will be reduced, resulting in instability. Such instability may be manifested by the tendency of the vehicle to rock back and forth during digging operations, for example.

The problem has been approached in several ways by earlier track assemblies. One type of prior design, exemplified in U.S. Pat. Nos. 3,447,620 and 3,447,621, includes double or triple walking beam suspensions in which the effective track lengths can be varied by raising one of the track-mounted wheels off the ground by a hydraulic cylinder so as to lower the walking beams and thereby raise the ground clearance of the vehicle.

U.S. Pat. No. 2,860,715 discloses a suspension arrangement in which the track carrier rollers are raised and lowered so as to vary the effective track lengths, thereby increasing the ground clearance of the vehicle.

The off-road, on-road vehicle disclosed in U.S. Pat. No. 3,182,741 includes tandem track-mounted wheels which can be rotated 90° to reduce the effective track lengths for off-road operation of the vehicle.

SUMMARY OF THE INVENTION

It is an object of the invention to provide a new and improved track assembly for use in track-supported vehicles, such as excavators and the like. More specifically, it is an object of the invention to provide a track assembly including an idler wheel which is rotatably mounted to a rigid, pivotally adjustable linking member which extends forwardly of the rigid undercarriage which supports the body of the vehicle. The linking member is adjustable, as by motor means, between first and second positions wherein the bottom of the idler wheel is positioned below or above the level of the bottom of the track rollers which support the undercarriage. Placement of the idler assembly in the lower position serves to provide a greater effective track length when the vehicle is positioned on soft or uneven ground, thereby imparting greater stability to the vehicle. The upper position of the idler assembly is convenient for travel of the vehicle over relatively flat and firm terrain.

The preferred embodiment of the invention includes independently selectively positionable idler assemblies for each of the two tracks of the vehicle, thereby allowing the vehicle's operator to obtain the optimal degree of stability for a given terrain.

Other features and advantages will become apparent from the following specification taken in connection with the accompanying drawings.

BRIEF DESCRIPTION OF THE DRAWINGS

The details of construction and operation of the invention are more fully described with reference to the accompanying drawings which form a part hereof and in which like reference numerals refer to like parts throughout.

In the drawings:

FIG. 1 is an elevational view of an excavator incorporating a track assembly of the type previously known in the art;

FIG. 2 is a slightly enlarged elevational view of a portion of a track-supported vehicle incorporating my improved track assembly, with the idler wheel assembly thereof shown in its lower position; and, FIG. 3 is a slightly enlarged elevational view of a portion of a track-supported vehicle, similar to the one shown in FIG. 2, with the idler wheel assembly shown in its raised position.

DESCRIPTION OF THE PREFERRED EMBODIMENT

Referring to FIG. 1, an exemplary embodiment of the prior art includes an excavator or similar vehicle, generally designated 10, provided with motive means (not shown). The vehicle shown in FIG. 1 is of a well-known type and comprises generally a frame 12 resting on a swing and gear bearing 14, which is, in turn, supported by the car body 16. The car body 16 rests on a pair of track assemblies, generally designated 18, only one of which is shown.

The function of the vehicle 10 is to dig and remove earth or other material from the underlying terrain 20. This is accomplished by means of the boom and bucket assembly, generally designated 22. The assembly 22 includes a boom 24, which is attached to the frame 12 at the pivot 26. The boom 24 is raised and lowered by means of the boom cylinder 28. The stick 30 is pivotally attached to the boom 24, as at pivot 32. Pivoting of the stick 30 is controlled by the stick cylinder 34.

A bucket or backhoe 36 is pivotally attached to the end 38 of the stick 30. The position of the bucket 36 relative to the stick 30 is controlled by the bucket cylinder 40 which communicates with the bucket 36 by the bucket linkage 42.

By independently controlling the cylinders 28, 34 and 40, the vehicle's operator (not shown) situated in the cab 44 may maneuver the bucket 36 so as to loosen and remove material from the terrain 20 and deposit the same in a suitable receptacle (not shown).

The frame 12 is swingably connected to the car body 16 by the swing and gear bearing 14. The car body 16 extends between two track assemblies 18 located at either side of the car body 16. Each side of the car body 16 is secured to and supported by a rigid undercarriage 46 which is, in turn, supported by a plurality of linearly aligned track rollers 48. A driven sprocket 50, covered by a sprocket guard 52, is situated rearwardly of the undercarriage 46 and serves to drive the endless track 54.

The track 54 is of the type well-known in the art and includes upper and lower runs 56 and 58, respectively. The lower run 58 supports and is guided by the track rollers 48. The track 54 comprises a circuit extending from the sprocket 50 through the lower run 58, around the idler wheel 60, and through the upper run 56. The upper run 56 is supported by the carrier rollers 62.

When the boom and bucket assembly 22 is used in excavation operations, substantial forces are transmitted to the frame 12 and track assemblies 18. More specifically, force may be applied to the forward portion of the vehicle 10 when the bucket 36 is engaged in breaking and removing material from the terrain 20. If the terrain upon which the vehicle is situated is uneven or soft, parts of the lower run 58 of each track 54 may not be in contact with the terrain 20. The stability of the vehicle 10 may be greatly reduced in such a case due to the reduced track length, resulting in undesirable rocking motion during excavation.

Accordingly, in keeping with one of the objects of the present invention, the vehicle 10 is equipped with a structure which will prevent the loss of stability by the vehicle 10 when it is operated on uneven or soft terrain.

Referring to FIG. 2, a track assembly 18 incorporating the features of my invention is provided. More specifically, a rigid bell-crank type linkage 64 is pivotally attached at pivot 66 to the front of the undercarriage 46. The linkage 64 extends forwardly of the undercarriage 46 and is supported by a track roller 69. The idler wheel 60 is rotatably mounted at pivot 68 on the forward portion of the linkage 64.

A suitable motor means 70, preferably and illustratively comprising a hydraulic cylinder 71, is connected at one end by pivot 72 to the linkage 64 and at the other end by pivot 73 to an intermediate portion 74 of the undercarriage 46. The cylinder 71 may be extended or retracted by the operator. In the preferred embodiment of the invention, each of the two track assemblies 18 will be provided with an idler wheel assembly, as described above, with each of the two cylinders 70 being independently operable.

When the cylinder 71 is extended, the linkage 64 will be disposed in a first or lowered position, shown in FIG. 2, wherein the linkage 64 is disposed downwardly and forwardly of pivot 66, and the bottom of the idler wheel 60 is disposed at or below the level of the bottoms of the track rollers 48. When the idler wheel 60 is in this position, the track 54 is relatively tight, and the effective length 75 of the lower run 58 extends from the bottom or tangent of the sprocket 50 to the bottom or tangent of the idler wheel 60. It is to be recognized that the degree of lowering of the idler wheel 60 can be varied as desired depending upon the demands and conditions of the surface.

When the idler wheel 60 is thus disposed, it may effectively function as an outrigger when the vehicle 10 is situated on uneven or soft terrain. Since the track length 75 is relatively long, a relatively large percentage of the lower run 58 may contact the surface of the terrain, thereby greatly increasing the stability of the vehicle 10. Further, since the linkage 64 on the opposite track assembly 18 (not shown) may be independently positioned, the vehicle 10 may be stabilized transversely, as well as longitudinally.

Referring to FIG. 3, the linkage 64 is shown in its second or raised position. The linkage 64 may be thus disposed by retraction of the cylinder 71. When the cylinder 71 is retracted, the linkage 64 pivots upward, thereby raising the idler wheel 60 so that the bottom or tangent of the track 54 to the wheel 60 will be higher than the bottoms or tangents of the track 54 to the track rollers 48.

When the linkage 64 is disposed in its second or raised position, the effective track length 75 of the lower run 58 will be substantially shorter than when the linkage 64 is disposed in its first or lowered position. The second position is desirable for roading and maneuvering, as a short effective track length results in easier steering and reduced horsepower requirements. Also, since the track 54 is relatively loose when the linkage 64 is in its second position, relatively little downward pressure is exerted on the carrier rollers 62, resulting in less vibration and a smoother ride than was previously possible.

Although the description has been directed primarily toward use of the invention on an excavator, it is to be recognized that it may be used on other track-type vehicles that must operate both from a standing position, where some function is performed by the vehicle, such as a side loader, and from a moving position, whereby the vehicle is moving from one location to another.

What is claimed is:

1. A track assembly for a track-supported vehicle,
   a body having an undercarriage extending downwardly therefrom,
   a pair of driven sprockets carried by one end portion of said undercarriage,
   a plurality of track rollers on each side of said undercarriage and in alignment with the sprocket on that side of said undercarriage.
   a pair of idler wheels,
   link means for supporting said idler wheels, said link means being pivotally mounted on said undercarriage and extending outwardly therefrom and said idler wheels being rotatably mounted on said link means,
   a pair of endless tracks, each one of which forms a circuit about one of said sprockets, one set of track rollers and one of said idler wheels, and
   means attached to said undercarriage and to said link means for moving at least one of said link means between a first raised position at which the tension on the track associated with said link means is decreased relative to a preselected value and a second lowered position at which the tension on said track is increased relative to said preselected value.

2. The track assembly of claim 1 wherein said means for moving said link means comprises a hydraulic cylinder for moving each of said idler wheels from said first position which is a position with the lower portion of said idler wheel raised from a horizontal plane containing the lower portions of said sprockets and said track rollers, to said second position which is a position with said lower portion of said idler wheel lowered below said horizontal plane.

3. In a track assembly for a track-supported vehicle having a body,
   an undercarriage operatively connected to said body,
   a pair of driven sprockets mounted on said undercarriage,
   a row of track rollers on said undercarriage in line with each of said sprockets,
   a pair of links pivotally attached to said undercarriage with one link aligned with one sprocket and the other link aligned with the other sprocket,
   an idler pivotally mounted on each of said links,
   each of said links being pivotally mounted about a transverse pivot axis between a first extreme position wherein the bottom of said idler is disposed higher than the plane containing the bottoms of said track rollers, and a second extreme position wherein the bottom of said idler is disposed lower than the plane containing the bottoms of said track rollers,
   an endless track encircling each sprocket, row of track rollers and idler, and
   means attached to said undercarriage and to each of said links for moving each of said links and attached idlers to any location from said first position to said second position whereby the tension on said track is lessened in said higher position of said idler and whereby the tension on said track is increased in said lowered position of said idler.

4. In a track assembly for a track-supported vehicle as claimed in claim 3 wherein said means for moving said links are a pair of hydraulic cylinders with each hydraulic cylinder mounted on the undercarriage for moving one of said idlers from one of said positions to another.

* * * * *